US010974968B2

(12) United States Patent
Xu et al.

(10) Patent No.: US 10,974,968 B2
(45) Date of Patent: Apr. 13, 2021

(54) PROCESS FOR RECOVERING AMMONIA FROM VANADIUM PREPARATION FOR AMMONIUM PREPARATION AND RECYCLING WASTEWATER

(71) Applicant: Zhongfanlian Technology Development Co., Ltd., Changsha (CN)

(72) Inventors: Xiaodi Xu, Suzhou (CN); Honghui Zhou, Liuyang (CN)

(73) Assignee: Zhongfanlian Technology Development Co., Ltd., Changsha (CN)

( * ) Notice: Subject to any disclaimer, the term of this patent is extended or adjusted under 35 U.S.C. 154(b) by 0 days.

(21) Appl. No.: 16/565,828

(22) Filed: Sep. 10, 2019

(65) Prior Publication Data
US 2020/0087152 A1 Mar. 19, 2020

(30) Foreign Application Priority Data

Sep. 13, 2018 (CN) .......................... 201811068047.6

(51) Int. Cl.
*C01C 1/02* (2006.01)
*C22B 34/22* (2006.01)
(52) U.S. Cl.
CPC .............. *C01C 1/026* (2013.01); *C22B 34/22* (2013.01)

(58) Field of Classification Search
CPC .................................. C01C 1/026; C22B 34/22
See application file for complete search history.

(56) References Cited

U.S. PATENT DOCUMENTS 4,119,707 A * 10/1978 Thome ................... C01G 31/02
423/594.17
4,336,102 A * 6/1982 Jacobs ................... D21C 11/02
162/30.1

* cited by examiner

*Primary Examiner* — Anthony J Zimmer
*Assistant Examiner* — Syed T Iqbal
(74) *Attorney, Agent, or Firm* — Troutman Pepper Hamilton Sanders LLP; Christopher C. Close, Jr.

(57) ABSTRACT

The present invention discloses a process for recovering ammonia from vanadium preparation for ammonium preparation and recycling wastewater. A conventional vanadium extraction process is complex, and the most difficult to control and treat are ammonia emissions and wastewater treatment. The present process can directly extract ammonium metavanadate and ammonium polyvanadate from the beginning of mining and smelting, and gather all emitted ammonia to prepare ammonium in the process of preparing high-purity vanadium pentoxide by using the ammonium metavanadate or the ammonium polyvanadate, thereby ensuring zero emission of the exhaust gas, and effectively treat all wastewater generated in the above process by using a polyacid ester flocculation technology, thereby ensuring that the wastewater is not discharged but recycled, and realizing that the purity of all products reaches 99.5-99.99%.

2 Claims, No Drawings

PROCESS FOR RECOVERING AMMONIA FROM VANADIUM PREPARATION FOR AMMONIUM PREPARATION AND RECYCLING WASTEWATER

TECHNICAL FIELD

The present invention belongs to the technical field of vanadium preparation, and particularly relates to a process for recovering ammonia from vanadium preparation for ammonium preparation and recycling wastewater.

BACKGROUND

Vanadium element is widely used in such fields as steel, non-ferrous metals, chemical industry, alloys, superconducting materials and automotive industry, and is an important strategic material.

In nature, vanadium element is extremely dispersed, usually in the form of V (III) and V (IV). V (III) is the majority, and the trivalent vanadium can enter a silicate mineral crystal lattice in the form of isomorphism, while the tetravalent vanadium can exist in a silicon-oxygen tetrahedral structure in the form of isomorphism. Such ores are difficult to leach. To leach the trivalent or tetravalent vanadium, the crystal structures must be destroyed to release the vanadium from the crystal structures.

Conventional vanadium extraction processes can be summarized into two representative types: a roasting vanadium extraction process (a fire method vanadium extraction process) and a wet method vanadium extraction process.

The wet method vanadium extraction process is directly acid-leaching a vanadium-containing ore to obtain a vanadium-containing liquid from a vanadium mineral under a high-concentration acidic condition, even in an environment with the presence of heat and pressure and an oxidant. The fire method vanadium extraction process is subjecting an ore to high-temperature oxidation roasting to oxidize and convert low-valent vanadium into pentavalent vanadium, and then wet-leaching to obtain a vanadium-containing liquid to extract vanadium from the ore. In the roasting vanadium extraction process, stone coal is subjected to salt-added oxidizing-sodiumizing roasting to form a vanadium-containing clinker; the vanadium-containing clinker is directly leached with process water (i.e. water immersion) to obtain a leachate having a lower vanadium concentration; ammonium chloride is added to precipitate vanadium to obtain an ammonium metavanadate precipitate, and then crude vanadium pentoxide (crude vanadium) is obtained by roasting; the crude vanadium is subjected to alkali dissolution, impurity removal, and secondary vanadium precipitation by ammonium chloride to obtain ammonium metavanadate; the ammonium metavanadate is thermally decomposed to obtain a vanadium pentoxide product having a purity of more than 98%, thus forming a "a sodium roasting, two-step vanadium precipitation process" or a "salt-added roasting vanadium extraction process". Alternatively, lime, limestone or any other calcium-containing compound is used as an additive to pelletize with the stone coal for roasting, so that vanadium is oxidized into a water-insoluble calcium salt of vanadium; then the calcium salt is carbonated and leached to form a vanadium-containing solution, which is then leached with an acid or a dilute alkali solution; subsequently, hydrolyzation vanadium precipitation, dissolved extraction or ion exchange is performed, and pyrolysis is used to refine the vanadium.

In short, after the vanadium ore is roasted with a salt to form the vanadium-containing clinker, water, an acid or an alkali must be used to leach the trivalent vanadium, tetravalent vanadium or pentavalent vanadium from the vanadium-containing clinker; then the vanadium salt is separated from other components in the leachate by extraction and back extraction or ion exchange; finally the vanadium salt reacts with ammonia water or any other ammonium salt to form an ammonium metavanadate precipitate, and the ammonium metavanadate precipitate is thermally decomposed to obtain a vanadium pentoxide product having high purity.

However, in the roasting vanadium extraction process, ammonia or the like gas will be reversed out of a roaster, and when the acid (sulfuric acid) is used for leaching, a large amount of wastewater will be generated; the wastewater contains sulfuric acid and sulfur dioxide, and even if a neutralization treatment is performed, the wastewater still contains sulfate and other harmful substances (such as ammonia nitrogen and residual sulfate radical). The conventional vanadium extraction process is complex, and the most difficult to control and treat are ammonia emissions and wastewater treatment. If the ammonia and wastewater generated in the above process are not treated technically, it will not only waste resources, but also cause environmental pollution to rivers and lakes, and even cause harm to human drinking water sources.

SUMMARY

In view of the problems of the process in the prior art, an objective of the present invention is to directly extract ammonium metavanadate ($NH_4VO_3$) and ammonium polyvanadate ($(NH_4)_2V_6O_{16}$) from the beginning of mining and smelting, and gather all emitted ammonia ($NH_3$) to prepare ammonium ($NH^{+4}$) in the process of preparing high-purity vanadium pentoxide ($V_2O_5$) by using the ammonium metavanadate ($NH_4VO_3$) or the ammonium polyvanadate ($(NH_4)_2V_6O_{16}$, thereby ensuring zero emission of the exhaust gas, and effectively treat all wastewater generated in the above process by using a polyacid ester (R) (a patented product, also known as a flocculant) technology, thereby ensuring that the wastewater all is not discharged but recycled, and realizing that the purity of all products reaches 99.5-99.99%.

The present invention is implemented by the following technical solutions.

A process for recovering ammonia from vanadium preparation for ammonium preparation and recycling wastewater, where a vanadium preparation process includes: 1) preparing ammonium metavanadate and ammonium polyvanadate; 2) using the ammonium metavanadate and the ammonium polyvanadate to prepare high-purity vanadium pentoxide, the process including the following steps: a, alkali dissolution: dissolving the ammonium metavanadate ($NH_4VO_3$) or the ammonium polyvanadate ($(NH_4)_2V_6O_{16}$) in an alkali (NaOH), heating the ammonium metavanadate ($NH_4VO_3$) or the ammonium polyvanadate ($(NH_4)_2V_6O_{16}$ for dissolution, a large amount of ammonia ($NH_3$) being generated at this time, subjecting the ammonia ($NH_3$) and water to a thermal separation technology, so that the ammonia ($NH_3$) enters a recovery tower, while a water vapor falls into a reactor; b, adjustment of pH: adjusting the pH with an acid while dissolving, during which ammonia ($NH_3$) enters the recovery tower, and a part of ammonia ($NH_3$) forms metal ammonium ($NH^{+4}$) due to the action of the acid; c, synthesis: where ammonium ($NH^{+4}$) is inside a sodium vanadate ($Na_3VO_4$) concentrate, and ammonia ($NH_3$) cannot be volatilized; d, washing: where a large amount of sodium salts are present in the ammonium metavanadate ($NH_4VO_3$), and the ammonium metavanadate ($NH_4VO_3$) must be washed with a certain amount of ammonium ($NH^{+4}$) protective water (R), and finally sprayed with an appropriate amount of pure water, thereby obtaining high-purity ammonium metavanadate ($NH_4VO_3$); e, drying: baking the ammonium metavanadate ($NH_4VO_3$) in an environment of 40-60° C. to remove water ($H_2O$) from the ammonium metavanadate ($NH_4VO_3$) at such temperature; and f, burning: converting the ammonium metavanadate ($NH_4VO_3$) into vanadium pentoxide ($V_2O_5$) in a furnace at 450-550° C., the ammonium ($NH^{+4}$) in the ammonium metavanadate ($NH_4VO_3$) being converted into ammonia ($NH_3$) at the high temperature, and inputting all the ammonia ($NH_3$) into an ammonia ($NH_3$) recovery tower or an ammonia ($NH_3$) recovery device for enrichment; introducing a strong acid into the ammonia ($NH_3$) recovery tower or the ammonia ($NH_3$) recovery device to gather the ammonia ($NH_3$) for preparation of various ammonium ($NH^{+4}$).

Preferably, the step of preparing the ammonium metavanadate or the ammonium polyvanadate includes: processing an ore, pulverizing by a ball mill, adding a conversion agent, pelletizing into a spherical shape of Φ 8-12 mm, roasting the pelletized vanadium material in an embodiment of 800-850° C., leaching, adjusting the pH, enriching to obtain a sodium vanadate concentrate or a vanadyl sulfate concentrate, transforming, removing an impurity, and synthesizing into the ammonium metavanadate or the ammonium polyvanadate.

Preferably, the step of leaching is: leaching a roasted vanadium (V) pellet, and water-leaching or acid-leaching the transformed or oxidized vanadium (V) out by using any one of the methods of cold leaching, hot leaching and spray leaching, to form a sodium vanadate ($Na_3VO_4$) solution or a vanadyl sulfate ($VOSO_4$) concentrate.

Preferably, the step of enriching is: water-leaching a low-vanadium (V) ore having a concentration of 2-10 g/L, adjusting the pH to 6-5 with an acid to turn inside vanadium (V) into a cation, enriching by using a cationic resin such as 731 or 717, and back-extracting with sodium hydroxide (NaOH) when the resin is saturated, where the enriched vanadium content can reach 120-150 g/L.

Preferably, the acid-leached vanadium concentrate is enriched by using any one of triphenyl phosphate TPP, ($C_6H_5O)_3PO$, di(2-ethylhexyl) phosphate ($C_{16}H_{35}O_4P$), an extractant P-204 and an organic phase component of sulfonated kerosene, and back-extracted with a strong acid (sulfuric acid), to enrich the vanadium concentrate to 120-150 g/L.

Preferably, the step of transforming is that: based on water-leaching, alkali back-extraction and cold pH adjustment, the sodium vanadate ($Na_3VO_4$) concentrate forms a red color when encountering an acid, and thus the sodium vanadate ($Na_3VO_4$) concentrate is heated to decouple an acid phase thereof from a vanadium ion, making the concentrate transformed into a water-shaped or oil-shaped state.

Preferably, the step of removing an impurity is: to ensure the quality of the ammonium metavanadate ($NH_4VO_3$), subjecting the transformed sodium vanadate ($Na_3VO_4$) concentrate to impurity removal with 2% polyacid ester (R) (a patented product, also known as a flocculant), so that a nonmetallic impurity is dissolved, precipitated, and pressure-filtered or filtered, and then storing the concentrate for further use.

Preferably, the step of synthesizing is: adding 1.1 times of ammonium chloride ($NH_4CL$), 1.5 times of ammonium sulfate ($NH_4)_2SO_4$ or 1.8 times of ammonium nitrate ($NH_4NO_3$) to the prepared concentrate according to different vanadium contents, and stirring and synthesizing to obtain the ammonium metavanadate ($NH_4VO_3$).

Preferably, the process of synthesizing the ammonium metavanadate ($NH_4VO_3$) is as follows: (1) using an ammonium ($NH^{+4}$) mother solution which has synthesized ammonium metavanadate ($NH_4VO_3$), determining a specific gravity to be 24-25 by a Baume pycnometer (°Bá), heating or condensing the ammonium ($NH^{+4}$) mother solution to a specific gravity of 28-29, adding 10% of ammonium chloride ($NH_4CL$), ammonium sulfate ($NH_4)_2SO_4$ or ammonium nitrate ($NH_4NO^{+3}$) to the ammonium ($NH^{+4}$) mother solution, stirring for dissolution, activating the ammonium ($NH_4$) mother solution, then determining the specific gravity to be 31-34 by the Baume pycnometer (°Bá), adding 2% of the polyacid ester (R) (a patented product, also known as a flocculant) to the ammonium ($NH^{+4}$) mother solution, stirring to dissolve an impurity out, thereby removing insoluble ammonium salt, sodium and sodium salt, and entering a re-synthesis stage for further use; and (2) when ammonium vanadate ($NH_4VO_3$) is synthesized, preparing the vanadium content of the sodium vanadate ($Na_3VO_4$) concentrate to 100-120 g/L, feeding the ammonium ($NH^{+4}$) mother solution prepared in (1) in a volume ratio of 45-55%, stirring for 1-2 h, solid ammonium metavanadate ($NH_4VO_3$) being formed inside and the vanadium content being 0.2-0.5 g/L at an upper layer of the concentrate at this time, draining or drying to obtain the ammonium metavanadate ($NH_4VO_3$), and recycling the ammonium mother solution used for the synthesis according to the operation procedure of (1).

The vanadyl sulfate concentrate obtained by acid leaching and strong acid back-extraction in the leaching step is heated to 60-90° C. and neutralized to a pH of 4-5 by using liquid ammonium, thereby obtaining the ammonium polyvanadate ($NH_4)_2V_6O_{16}$.

The present invention has the following advantages.

1. During the smelting of a vanadium (V) ore resource, a roasted powder or pellet is leached with an acid or water, and the concentration of leached vanadium (V) is generally 4-10 g/L, so that an enrichment treatment must be performed by using an organic phase or a resin; however, the enrichment requires a large amount of water, and generally prepares 150-300 tons of acidic wastewater per ton of a product.

2. The present process uses lime (CaO) or sodium hydroxide (NaOH) to neutralize to a pH of 7.6-7.8, but the wastewater can not be discharged at this time, as the wastewater contains a large amount of heavy metals such as chromium (Cr) and titanium (Ti) and impurities and toxic components such as silicon (Si), calcium (Ca), magnesium (Mg) and soil, and different mineral sources prepare different impurities. At present, the commonly used evaporation method is not likely to achieve a control effect, and it is unrealistic to evaporate 150-300 tons of wastewater per ton of vanadium pentoxide ($V_2O_5$); even an advanced isolating membrane technology cannot achieve the desired effect, as an isolating membrane can handle a conductivity of only 300-500 S/m, but the conductivity of the wastewater at this time has reached 5,000-10,000 S/m, so that the wastewater is impossible to pass through the isolating membrane. For this reason, the present process adds a polyacid ester (R) (a patented product, also known as a flocculant) to the neutralized wastewater, and all the impurities, heavy metals and toxic components can be dissolved and precipitated after 20-30 min of stirring; at this time, the precipitated particles are fine, suspended, and are not prone to precipitation.

3. The present process adds a certain proportion of amorphous white carbon black ($SiO_2$), which mainly has the following functions in wastewater treatment: (1) adsorption;

(2) color removal; (3) suspended impurity precipitation; and (4) purification, etc. Therefore, the present process can accelerate the precipitation of the above suspended matters and facilitate clarification filtration.

4. The present process can directly extract the ammonium metavanadate ($NH_4VO_3$) and ammonium polyvanadate ($(NH_4)_2V_6O_{16}$) from the beginning of mining and smelting, and gather all emitted ammonia ($NH_3$) to prepare ammonium ($NH^{+4}$) in the process of preparing high-purity vanadium pentoxide ($V_2O_5$) by using the ammonium metavanadate ($NH_4VO_3$) or the ammonium polyvanadate ($(NH_4)_2V_6O_{16}$), thereby ensuring zero emission of the exhaust gas, and effectively treat all wastewater generated in the above process by using a polyacid ester (R) (a patented product, also known as a flocculant) technology, thereby ensuring that the wastewater all is not discharged but recycled, and realizing that the purity of all products reaches 99.5-99.99%.

5. A "conversion inducer for vanadium-containing filtered solid during vanadium ore smelting and roasting" prepared from the present process has applied for national patent (patent number: 201711297727.0), and can be used as a separate product for the conversion of a vanadium ore product.

6. The "polyacid ester" used in the present invention is concentrated phosphodiester, which is a patented product of an invention, also known as a flocculant, sold at Taicang Changfeng Chemical Plant in Jiangsu Province.

DETAILED DESCRIPTION

The following further describes the present invention with reference to illustrative embodiments, which are not intended to limit the scope of the present invention, and all materials implemented based on the techniques of the present invention described above shall all fall within the protection scope of the present invention.

I. Ammonium metavanadate ($NH_4VO_3$) and ammonium polyvanadate ($(NH_4)_2V_6O_{16}$) can be prepared by using a "one-step method" from the beginning of mining and smelting.

A crude vanadium ore is leached to obtain a sodium vanadate concentrate (prepared with different contents by different processes according to different crude vanadium contents) to prepare the ammonium metavanadate ($NH_4VO_3$) and the ammonium polyvanadate ($(NH_4)_2V_6O_{16}$). The process is generally as follows.

Vanadium ore→Ore processing→Pulverization→Addition of conversion agent ↓Pelletizing→Roasting→Leaching→Adjustment of pH→Enrichment ↓Obtaining of sodium vanadate concentrate→Adjustment of pH→Transformation-↓Synthesis→Obtaining of ammonium metavanadate or ammonium polyvanadate 1. Vanadium ore. Vanadium slag, vanadium mud or coal gangue which contains vanadium (V).

2. Ore processing. Impurities other than vanadium (V) are removed.

3. Pulverization. The vanadium slag, vanadium mud or coal gangue containing vanadium (V) is pulverized by a ball mill.

4. Addition of conversion agent. Different conversion agents or oxidizing agents such as soda ash ($Na_2CO_3$), barite ($BaSO_4$) or other cerium salts are added to different vanadium (V) ore resources, and a salt (NaCL) may also be added.

5. Pelletizing. Low-grade vanadium (V) ore resources, such as vanadium oxide mud and coal gangue are made into a Φ 8-12 mm spherical shape, and a high-grade vanadium (V) ore resource can be made into a powder.

6. Roasting. The milled powder and the pelletized vanadium material are roasted (or burned) at 800-850° C. to achieve the purposes of converting and oxidizing vanadium (V) in different roasters or different equipment.

7. Leaching. The roasted vanadium (V) powder or vanadium (V) pellet is water-leached or acid-leached with cold leaching, hot leaching or spray leaching, with the purpose of leaching the converted or oxidized vanadium (V) out to form a sodium vanadate ($Na_3VO_4$) concentrate or a vanadyl sulfate ($VOSO_4$) concentrate.

8. Adjustment of pH. The pH is adjusted by using different extraction methods, but is not needed to adjust in case of acid leaching.

9. Enrichment. A low-vanadium (V) ore is water-leached, and generally has a concentration of 2-10 g/L, so the pH must be adjusted to 6-5 with an acid to turn the inside vanadium (V) into a cation; a cationic resin such as 731 or 717 is used for enriching, and sodium hydroxide (NaOH) is used for back-extracting when the resin is saturated, where the enriched vanadium content can generally reach 120-150 g/L. In case of acid leaching, the concentrate can be leached with triphenyl phosphate TPP or $(C_6H_5O)_3PO$, or enriched by di(2-ethylhexyl) phosphate ($C_{16}H_{35}O_4P$), an extractant P-204 or an organic phase component of sulfonated kerosene, and back-extracted with a strong acid (sulfuric acid), which can also enrich the vanadium concentrate to 120-150 g/L.

10. Obtaining. The sodium vanadate ($Na_3VO_4$) concentrate or the vanadyl sulfate ($VOSO_4$) concentrate is accordingly obtained. The sodium vanadate ($Na_3VO_4$) concentrate is prepared by the process of water leaching, acid extraction and alkali back-extraction, while the vanadyl sulfate ($VOSO_4$) concentrate is prepared by the process of acid leaching and strong acid back-extraction.

11. Adjustment of pH. The obtained vanadium concentrate varies with different enrichment and back-extraction methods. A water-leached concentrate is back-extracted with sodium hydroxide (NaOH) to produce an alkaline concentrate, called sodium vanadate ($Na_3VO_4$) concentrate, in which case the pH must be adjusted to 7.8-8.5 for further use. A concentrate that is acid-leached and back-extracted with a strong acid does not need to adjust its pH for further use.

12. Transformation. Based on water leaching, alkali back-extraction and cold pH adjustment, the sodium vanadate ($Na_3VO_4$) concentrate forms a red color when encountering an acid, and thus, the sodium vanadate ($Na_3VO_4$) concentrate must be properly heated to decouple an acid phase thereof from a vanadium ion, making the concentrate transformed into a water-shaped or oil-shaped state (see 4 for acid leaching and strong acid back-extraction).

13. Impurity removal. To ensure the quality of the ammonium metavanadate ($NH_4VO_3$), the transformed sodium vanadate ($Na_3VO_4$) concentrate must be subjected to impurity removal with 2% polyacid ester (R) (a patented product, also known as a flocculant), so that a nonmetallic impurity is dissolved, precipitated, and pressure-filtered or filtered, and then the concentrate is stored for further use (see 4 for acid leaching and strong acid back-extraction).

14. Synthesis. Ammonium chloride ($NH_4CL$), ammonium sulfate ($(NH_4)_2SO_4$ or ammonium nitrate ($NH_4NO_3$) is added to the concentrate prepared above according to different vanadium contents (1+1.2-1.6, or the like), and the concentrate is stirred and synthesized to obtain the ammonium metavanadate ($NH_4VO_3$).

The process of synthesizing the ammonium metavanadate ($NH_4VO_3$) is as follows:

(1) use an ammonium ($NH^{+4}$) mother solution which has synthesized ammonium metavanadate ($NH_4VO_3$), determine a specific gravity to be 24-25 by a Baume pycnometer (°Bá), heat or condense the ammonium ($NH^{+4}$) mother solution to a specific gravity of 28-29, add 10% of ammonium chloride ($NH_4CL$), ammonium sulfate ($NH_4)_2SO_4$ or ammonium nitrate ($NH_4NO^{+3}$) to the ammonium ($NH^{+4}$) mother solution, stir for dissolution, activate the ammonium ($NH_4$) mother solution, then determine the specific gravity to be 31-34 by the Baume pycnometer (°Bá), add 2% of the polyacid ester (R) (a patented product, also known as a flocculant) to the ammonium ($NH^{+4}$) mother solution, stir to dissolve an impurity out, thereby removing insoluble ammonium salt, sodium and sodium salt, and enter a re-synthesis stage for further use; and (2) when ammonium vanadate ($NH_4VO_3$) is synthesized, prepare the vanadium content of the sodium vanadate ($Na_3VO_4$) concentrate to 100-120 g/L, feed the ammonium ($NH^{+4}$) mother solution prepared in (1) in a volume ratio of 45-55%, stir for 1-2 h, solid ammonium metavanadate ($NH_4VO_3$) being formed inside and the vanadium content being 0.2-0.5 g/L at an upper layer of the concentrate at this time, drain or dry to obtain the ammonium metavanadate ($NH_4VO_3$), and recycle the ammonium mother solution used for the synthesis according to the operation procedure of (1).

A concentrate obtained by acid leaching and strong acid back-extraction should be heated to 60-90° C. and neutralized to a pH of 4-5 by using liquid ammonium, thereby obtaining the ammonium polyvanadate ($NH_4)_2V_6O_{16}$.

II. In the process of preparing high-purity vanadium pentoxide ($V_2O_5$) by using the ammonium metavanadate ($NH_4VO_3$) or the ammonium polyvanadate ($NH_4)_2V_6O_{16}$, all ammonia is recovered to prepare ammonium.

The process flow and preparation method are as follows.

Alkali dissolution→Adjustment of pH→Synthesis→Washing→Drying→Burning↓Ammonium

1. Alkali dissolution. An alkali (NaOH) dissolution method is necessary for preparing the high-purity vanadium pentoxide ($V_2O_5$) by using the ammonium metavanadate ($NH_4VO_3$) or the ammonium polyvanadate ($NH_4)_2V_6O_{16}$; the process of alkali dissolution is heating the ammonium metavanadate ($NH_4VO_3$) or the ammonium polyvanadate ($NH_4)_2V_6O_{16}$ for dissolution, which will inevitably produce a large amount of ammonia ($NH_3$); the ammonia ($NH_3$) and water must be subjected to a thermal separation technology, so that the ammonia ($NH_3$) enters a recovery tower, while a water vapor falls into a reactor.

2. Adjustment of pH. During the process of adjusting the pH with an acid while dissolving, ammonia ($NH_3$) enters the recovery tower, and a part forms metal ammonium ($NH^{+4}$) due to the action of the acid, which is conducive to the regeneration and purification of the ammonia ($NH_3$).

3. Synthesis. Since ammonium ($NH^{+4}$) is inside the sodium vanadate ($Na_3VO_4$) concentrate, the ammonia ($NH_3$) is not likely to volatilize.

4. Washing. As high-purity ammonium metavanadate ($NH_4VO_3$) is obtained from a concentrate of ammonium vanadate ($NH_4VO_3$) and alkali (NaOH), a large amount of sodium salts are present in the ammonium metavanadate ($NH_4VO_3$), and the ammonium metavanadate ($NH_4VO_3$) must be washed with a certain amount of ammonium ($NH^{+4}$) protective water (R) (otherwise sodium vanadate will dissolve in water), and finally sprayed with an appropriate amount of pure water, thereby obtaining the high-purity ammonium metavanadate ($NH_4VO_3$);

5. Drying. The ammonium metavanadate ($NH_4VO_3$) is baked in an environment of 40-60° C.; due to an inside factor, only water ($H_2O$) can be removed from the ammonium metavanadate ($NH_4VO_3$) at such temperature, but the ammonium ($NH_3$) is not likely to volatilize.

6. Burning. The ammonium metavanadate ($NH_4VO_3$) is converted into vanadium pentoxide ($V_2O_5$) in a furnace at 450-550° C., and the ammonium ($NH^{+4}$) in the ammonium metavanadate ($NH_4VO_3$) is converted into ammonia ($NH_3$) at the high temperature; then all the ammonia ($NH_3$) must be put into an ammonia ($NH_3$) recovery tower or an ammonia ($NH_3$) recovery device for enrichment. In the ammonia ($NH_3$) recovery tower or the ammonia ($NH_3$) recovery device, hydrochloric acid (HCL) is introduced to prepare ammonium chloride ($NH_4Cl$), sulfuric acid ($H_2SO_4$) is introduced to prepare ammonium sulfate ($NH_4)_2SO_4$, and nitric acid ($NHO_3$) is introduced to prepare ammonium nitrate ($NH_4NO_3$). This process has achieved multiple purposes that, not only the high-purity vanadium pentoxide ($V_2O_5$) is obtained, but also all the ammonia ($NH_3$) is gathered to prepare ammonium ($NH^{+4}$), not only the evaporation of the ammonia ($NH_3$) is prevented and the air is purified, but also the cost is reduced and the economic benefits are increased.

The above is merely a specific description of a possible embodiment of the present invention, and the embodiment is not intended to limit the patentable scope of the present invention, and any equivalent implementation or modification made without departing from the concept of the present invention shall fall within the patentable scope of the present invention.

What is claimed is:

1. A process for vanadium preparation with recovering ammonia for ammonium preparation and recycling wastewater, wherein the vanadium preparation process comprises:
   1) providing ammonium metavanadate and ammonium polyvanadate;
   2) using the ammonium metavanadate and the ammonium polyvanadate to prepare vanadium pentoxide comprising the following steps:
   a. dissolving the ammonium metavanadate or the ammonium polyvanadate ($NH_4)_2V_6O_{16}$ in an alkali; heating the ammonium metavanadate or the ammonium polyvanadate ($NH_4)_2V_6O_{16}$ for dissolution; ammonia being generated; thermally separating the ammonia and water, so that the ammonia enters a recovery tower, while a water vapor falls into a reactor, wherein the alkali is NaOH;
   b. adjusting the pH with an acid while dissolving, during which the ammonia enters the recovery tower, and a part of the ammonia forms metal ammonium due to action of the acid;
   c. washing, wherein sodium salts are present in the ammonium metavanadate, and the ammonium metavanadate is washed with ammonium protective water, and finally sprayed with water, thereby obtaining ammonium metavanadate;
   d. drying the ammonium metavanadate in an environment of 40-60° C. to remove water from the ammonium metavanadate at such temperature; and
   e. converting the ammonium metavanadate into vanadium pentoxide in a furnace at 450-550° C., the ammonium in the ammonium metavanadate being converted into ammonia, and inputting all the ammonia into an ammonia recovery tower or an ammonia recovery device for enrichment; introducing an acid into the ammonia recovery tower or the ammonia recovery device to prepare ammonium.

2. The process for vanadium preparation with recovering ammonia for ammonium preparation and recycling wastewater according to claim 1, wherein the ammonium metavanadate is synthesized as follows:
- (1) using an ammonium mother solution for synthesizing ammonium metavanadate, with a specific gravity of 24-25 as determined by a Baume pycnometer, heating or condensing the ammonium mother solution to a specific gravity of 28-29, adding 10% of ammonium chloride, ammonium sulfate or ammonium nitrate to the ammonium mother solution, stirring for dissolution, activating the ammonium mother solution, to obtain an ammonium mother solution with a specific gravity of 31-34 as determined by the Baume pycnometer, adding 2% of polyacid ester to the ammonium mother solution, stirring to dissolve an impurity out, thereby removing insoluble ammonium salt, sodium and sodium salt, and entering a re-synthesis stage for further use; and
- (2) when ammonium vanadate is synthesized, preparing the content of vanadium of the sodium vanadate concentrate to 100-120 g/L, feeding the ammonium mother solution prepared in (1) in a volume ratio of 45-55%, stirring for 1-2 h, solid ammonium metavanadate being formed inside and the content of vanadium being 0.2-0.5 g/L at an upper layer of the concentrate at this time, draining or drying to obtain the ammonium metavanadate, and recycling the ammonium mother solution used for the synthesis according to the operation procedure of (1).

* * * * *